(12) United States Patent
Olberding et al.

(10) Patent No.: US 7,874,542 B2
(45) Date of Patent: Jan. 25, 2011

(54) ACTUATOR LEVERS, COLLETS, AND COLLET REMOVERS

(75) Inventors: Jason Gene Olberding, Marshalltown, IA (US); Douglas James Boyd, Marshalltown, IA (US); Paul Andrew Day, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 1204 days.

(21) Appl. No.: 11/501,315

(22) Filed: Aug. 9, 2006

(65) Prior Publication Data

US 2008/0048403 A1 Feb. 28, 2008

(51) Int. Cl.
*F16K 31/00* (2006.01)
(52) U.S. Cl. ........................ 251/292; 251/304; 403/371
(58) Field of Classification Search ................. 251/291, 251/292, 304, 305; 403/368, 370, 371; 29/242, 29/243
See application file for complete search history.

(56) References Cited

U.S. PATENT DOCUMENTS

| | | | |
|---|---|---|---|
| 1,521,202 A | 12/1924 | Osgood | |
| 2,753,147 A * | 7/1956 | Welge | 251/233 |
| 2,873,942 A * | 2/1959 | Drane | 251/151 |
| 3,190,609 A | 6/1965 | Kintigh | |
| 4,205,820 A * | 6/1980 | Bray | 251/94 |
| 4,457,061 A * | 7/1984 | Eason | 29/264 |
| 4,498,336 A * | 2/1985 | Dalton | 73/168 |
| 5,176,464 A | 1/1993 | Tanner | |
| 5,197,338 A | 3/1993 | Heiman et al. | |
| 5,951,198 A * | 9/1999 | Phillips | 403/369 |
| 5,975,106 A | 11/1999 | Morgan et al. | |
| 6,599,052 B1 * | 7/2003 | Phillips | 403/367 |
| 6,666,129 B1 | 12/2003 | Schmid et al. | |
| 2003/0014854 A1 | 1/2003 | Brown | |
| 2003/0084556 A1 | 5/2003 | Dunlop | |

FOREIGN PATENT DOCUMENTS

| | | |
|---|---|---|
| DE | 3827428 | 2/1990 |
| DE | 3927396 | 10/1990 |
| EP | 0524589 A2 | 1/1993 |
| GB | 2327464 | 1/1999 |

OTHER PUBLICATIONS

International Searching Authority, "International Search Report", in connection with PCT/US 2007/014528 issued on Jan. 3, 2008, 7 pages.

(Continued)

*Primary Examiner*—John K Fristoe, Jr.
(74) *Attorney, Agent, or Firm*—Hanley, Flight & Zimmerman, LLC

(57) ABSTRACT

Actuator levers, collets and collet tools for use in process control devices are disclosed. An example apparatus includes an actuator lever, a collet coupled to the actuator lever, and a collet tool. In the example apparatus, the collet tool is removably coupled to at least one of the lever or the collet, and the collet tool applies a force to at least one of the actuator lever, the collet, a valve shaft, or an intervening structure to couple or decouple the collet to or from the lever.

29 Claims, 5 Drawing Sheets

OTHER PUBLICATIONS

International Searching Authortiy, "Written Opinion of the International Searching Authority", in connection with PCT/US 2007/014528 issued on Jan. 3, 2008, 7 pages.

Fisher Controls, International, Inc., "High Performance Butterfly Valves", Product Flier PF51.6:8510B, Mar. 1997, 20 pages.

Samson A.G., "Pneumatic Butterfly Valve Type 3335/AT and Type 3335/3278", EB 8220 EN, Edition Nov. 2000, 10 pages.

McMaster-Carr, "Collets & Arbors", McMaster-Carr Catalog #110, 2004, 1 page.

International Searching Authority, "International Search Report", in connection with PCT/US2005/019974 issued Oct. 18, 2005, 5 pages.

International Searching Authority, "Written Opinion of the International Searching Authority", in connection with PCT/US2005/019974 issued Oct. 18, 2005, 6 pages.

Dezurik, "Accurate Control with Rack and Pinion Style Actuators", Application Data 74.01-3, Apr. 1996, 2 pages.

"The Notification of the First Office Action," issued by the State Intellectual Property Office of P.R. China on Jun. 11, 2010, in connection with Chinese Application No. 200780029547.2, 6 pages.

* cited by examiner

ACTUATOR LEVERS, COLLETS, AND COLLET REMOVERS

FIELD OF THE DISCLOSURE

The present disclosure relates generally to process control devices and, more particularly, to actuator levers, collets and collet removers for use with process control devices.

BACKGROUND

Fluid process systems typically use valves such as, for example, rotary valves to control temperature, pressure, and other parameters associated with a fluid control process. Rotary valves typically have a valve stem or shaft that is mechanically coupled to an actuator. In operation, the actuator may rotate the valve shaft to cause a control element (e.g., a disc) to move between an open position that permits the passage of fluid through the valve and a closed position that substantially prevents the passage of fluid through the valve. Rotary valves are typically installed in-line with a pipe so that as the control element (e.g., a disc) moves (i.e., opens/closes), the flow of fluid through the valve and, thus, through the pipe may be varied (e.g., in a throttling control operation or an on/off operation).

As is known, actuators are typically coupled to a shaft of a valve to operate the valve between an open position and a closed position and may be implemented using electric, pneumatic, and/or hydraulic device(s). To facilitate the compatibility of process control valves with a variety of actuators, many available process control valves have shafts that are compliant with well-known standards. For example, the International Standards Organization (ISO) has developed a standard for square shafts that specifies shaft size, shaft dimensions, and shaft extension. Adherence to the ISO standard ensures that actuators and valves made by multiple manufacturers can be interchangeably coupled to each other without requiring modification of the actuators or valves. In particular, the valve shaft specification or ISO standard is particularly advantageous when purchasing off-the-shelf actuators.

Many off-the-shelf actuators provide shaft receptacles having a square bore that comply with the ISO standard. The square bore is typically manufactured using a broaching technique in which a thick saw-like cutting tool having a plurality of teeth is driven through a solid shaft or receptacle. In this manner, material is removed in a precise manner to form a bore dimensioned to receive a square valve shaft. However, broaching is an undesirable technique due to the precision or tolerances required to provide properly dimensioned bores (i.e., bores that are not too large or too small). In many instances, to ensure that the dimensions of the shaft receptacle are compliant with the ISO standard, the inner dimensions of the shaft receptacle are made substantially larger than the outer dimensions of a valve shaft.

For most on/off applications, the inner dimensions of the shaft receptacle may be significantly larger than the outer dimensions of the valve shaft without compromising operation. However, for throttling applications, in which the position of a control element (e.g., a disc) is varied (e.g., modulated about a control point) between a fully closed and a fully open position, oversized shaft receptacles are not suitable. An oversized shaft receptacle typically results in a loose mechanical coupling and, thus, lost motion between the shaft receptacle and the shaft of the process control device.

Lost motion may be generally defined as the difference in angular rotation between a shaft receptacle and a shaft and is typically a result of a loose coupling between the shaft receptacle and the shaft. For example, if a loose coupling is made between a shaft receptacle and a substantially square shaft, the angular rotation of the shaft receptacle may be different from the rotational displacement of the shaft.

In general, lost motion may lead to inaccurate positioning of the valve disc and poor control over the fluid flowing through the valve. Lost motion may be reduced by placing a collet in a lever in a valve assembly actuator. The collet couples the valve shaft to the lever, which is rotated by the actuator to open and close the valve. Collets provide a substantially tight coupling between the lever and the valve shaft without requiring the use of wedges, shaft keys, or the like.

When a valve assembly is disassembled, for example during an outage or for routine maintenance, the valve shaft must be removed from the actuator. Removing the valve shaft from the actuator may be accomplished by decoupling the collet from the lever. Typically, collets are removed with the use of blunt force such as, for example, by hitting the actuator with a hammer until the collet is unseated or loosened from the lever. This is undesirable as it requires a lot of effort (especially for large shaft sizes), and hammering on the end of the collet or valve shaft has the potential to cause internal damage to the valve assembly.

SUMMARY

Example apparatus including actuator levers, collets and collet tools disclosed herein may be used with a process control device. In one example apparatus, an actuator lever is coupled to the collet. The example apparatus also includes a collet tool that is removably coupled to at least one of the actuator lever or the collet. Furthermore, the collet tool applies a force to at least one of the actuator lever, the collet, a valve shaft, or an intervening structure that may located in the lever. The force applied by the collet tool decouples the collet from the actuator lever.

In accordance with another example, a tool for installing or removing a collet from an actuator lever includes at least one of a plurality of inner-diameter threads, a plurality of outer-diameter threads, or a plate to removably couple the tool to at least one of an actuator lever or a collet. The tool is configured to apply a force to at least one of the actuator lever, the collet, a valve shaft, or an intervening structure to install the collet in or remove the collet from the actuator lever.

In accordance with yet another example, a means for installing a collet in or removing a collet from a lever in a process control device includes means for removably coupling a collet tool to at least one of the lever or the collet. The means for installing the collet in or removing the collet from the lever also includes means for applying a force through the collet tool to at least one of the lever, the collet, a valve shaft or an intervening structure to install the collet in or remove the collet from the lever.

DETAILED DESCRIPTION

Figure 1:
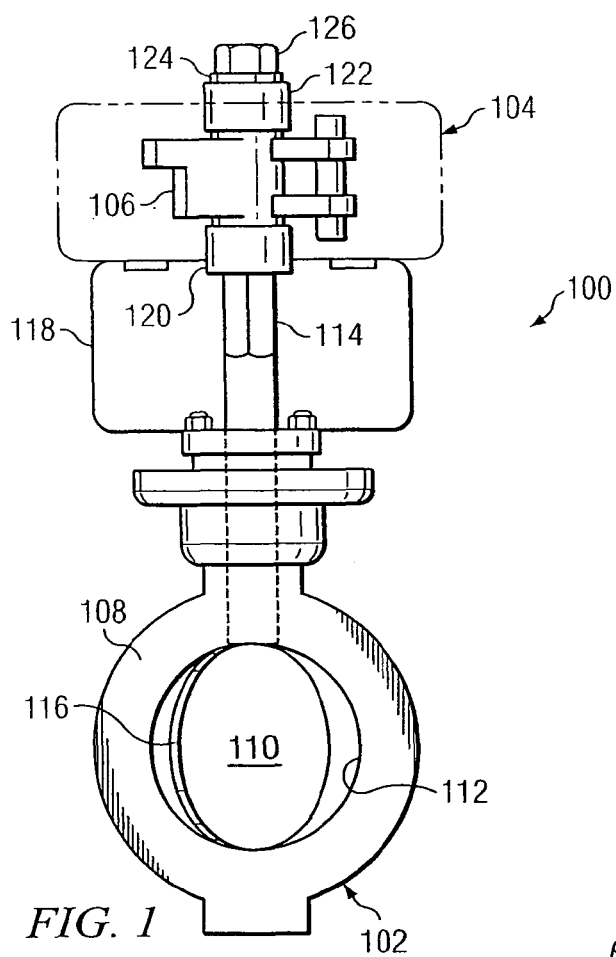
FIG. 1 depicts an example valve assembly.

FIG. 1 depicts an example valve assembly 100. The example valve assembly 100 may be used in a process control system to control, for example, temperature, pressure, or flow rate. The example valve assembly 100 may be used to open a fluid path, close a fluid path, and/or vary the size of (i.e., throttle) an opening in a fluid path. For example, as a fluid flows through a fluid path including the example valve assembly 100, varying the size of an opening in the example valve assembly 100 causes the flow rate of the fluid in the fluid path to be reduced or increased based on the degree to which the valve assembly 100 is opened or closed.

As shown in FIG. 1, the example valve assembly 100 includes a valve 102, an actuator 104, and a lever 106. The lever 106 is mechanically coupled to the actuator 104 as described below in connection with FIGS. 2B through 3B. The actuator 104 is configured to actuate (i.e., rotate, turn, etc.) the lever 106 about its axis to open/close the valve 102. The valve 102 includes a valve body 108, a control element 110 (e.g., a disc) positioned within an inner surface or chamber 112 of the valve body 108, and a valve shaft 114 mechanically coupled to the control element 110 as shown by hidden lines. The valve shaft 114 is shown as a substantially square shaft and may be designed to conform to an ISO standard for square shafts. However, the valve shaft 114 may be implemented using any other shape (e.g., any polygonal shape) and size. For example, one of ordinary skill in the art should appreciate that the shaft may be substantially circular in cross-sectional except for an end portion that may be polygonal or substantially square to engage an ISO standard actuator. Additionally, one skilled in the art may also contemplate the example collet, lever and collet tool being used with a known keyed shaft without departing from the spirit and scope of the present invention.

In a closed position, the control element 110 may be in a seated position in which a sealing surface 116 of the control element 110 is in contact with the inner surface 112 of the valve body 108, thereby preventing the flow of fluid through the valve body 108. Moving the control element 110 to a fully open position may involve rotating the valve shaft 114 so that the control element 110 is in a substantially perpendicular orientation relative to the opening defined by the inner surface 112. Throttling the control element 110 may involve adjusting and controlling the position of the control element 110 between a fully open position and a fully closed position to achieve a desired process fluid flow or pressure reduction. In addition, throttling the control element 110 may be performed in connection with a feedback system that is configured to continually measure the flow and/or pressure of a process fluid. The feedback system may then cause, for example, the actuator 104 to at least partially actuate the lever 106 in response to changes in the flow and/or pressure of the process fluid. In this case, minimizing or reducing lost motion between the lever 106 and the valve shaft 114 is crucial to achieving precise positioning of the control element 110.

As shown in FIG. 1, the actuator 104 is mechanically coupled to the valve 102 via a mounting bracket 118. The actuator 104 may include any powered or non-powered actuating device that is capable of rotating the valve shaft 114. As is known, actuators are typically implemented using electric, pneumatic, and/or hydraulic device(s). Alternatively, the actuator 104 may be implemented using any non-powered actuating device such as, for example, a hand operated device, etc.

The lever 106 includes a first coupling 120 and a second coupling 122. Although the first coupling 120 is shown as being mechanically coupled to the valve shaft 114, the second coupling 122 may also be configured to be mechanically coupled to the valve shaft 114 as described below. The lever 106 may impart a rotational force to the valve shaft 114 via the first coupling 120 and/or the second coupling 122. For example, as the lever 106 rotates, the first coupling 120 rotates the valve shaft 114 to cause the control element 110 to move between an open position and a closed position.

The lever 106 engages a washer 124 that is captured between the lever 106 and a draw nut 126. As described in connection with FIGS. 3A and 3B below, the washer 124 and the draw nut 126 enable the first coupling 120 and/or the second coupling 122 to engage (e.g., to be clamped to) the valve shaft 114. Additionally, the couplings 120 and 122 are configured to be substantially similar or identical so that the actuator 104 may be turned 180° to change a fail-safe operation of the valve 102 as described below in connection with FIGS. 2A and 2B.

Figure 2A:
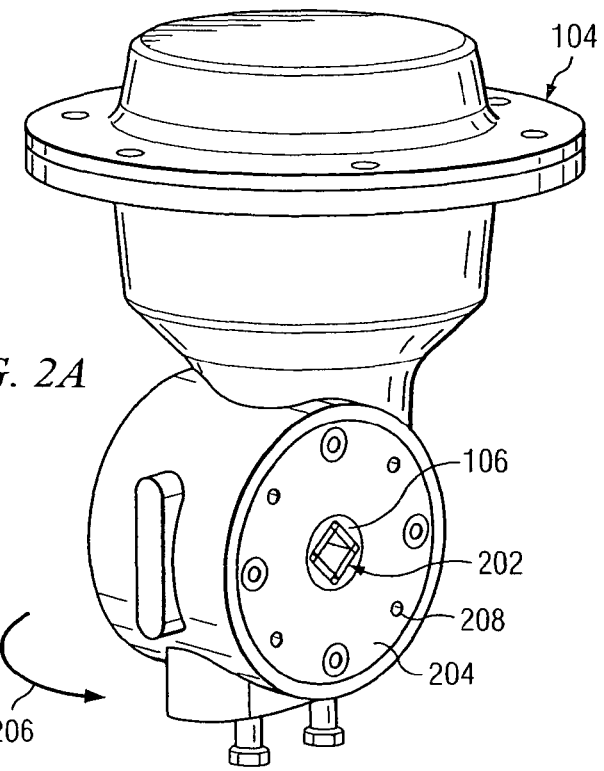
FIGS. 2A and 2B are isometric views of the actuator of FIG. 1.
Figure 2B:
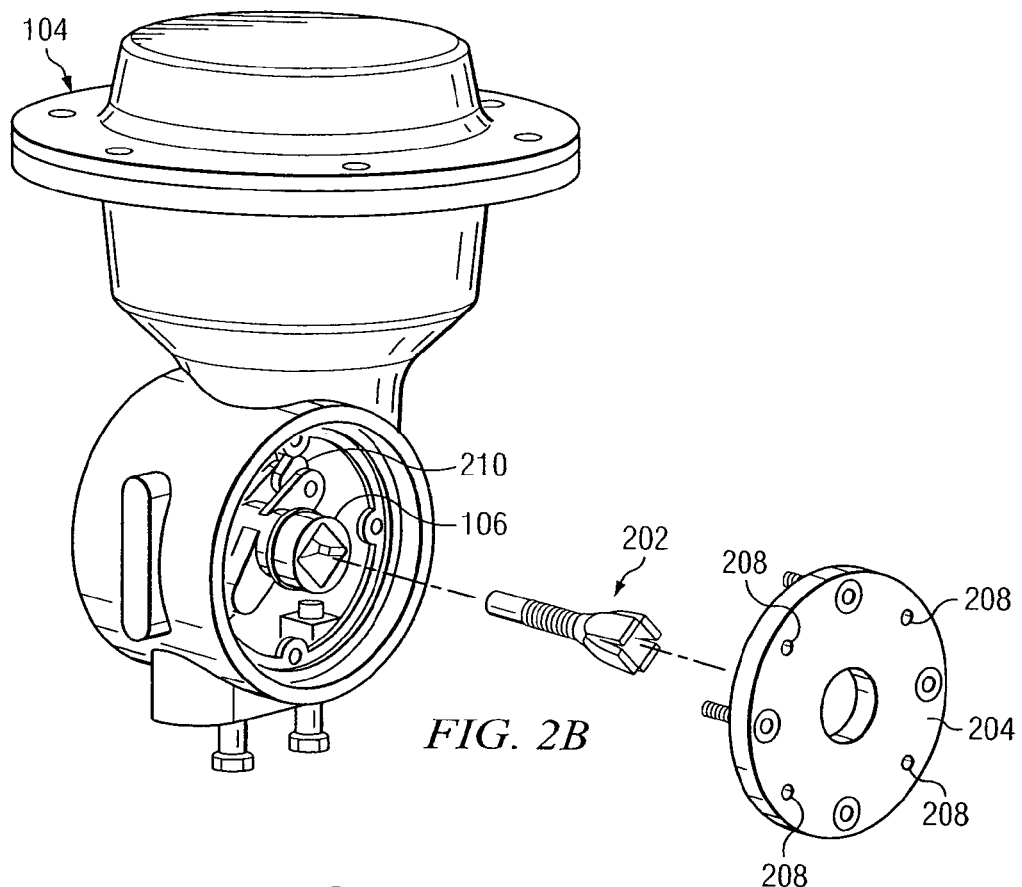

FIGS. 2A and 2B are isometric views of the actuator 104 of FIG. 1. FIGS. 2A and 2B generally depict the manner in which the lever 106 of FIG. 1 is rotatably coupled to the actuator 104. As described above in connection with FIG. 1, the actuator 104 may be mechanically coupled to a shaft (e.g., the valve shaft 114 of FIG. 1) to rotate the shaft. Although the actuator 104 is shown as a spring and diaphragm actuator, any other suitable actuating device may be used. The actuator 104 also includes a first faceplate 204, which is shown as a front side of the actuator 104, and a second faceplate (not shown) on the side opposite the first faceplate 204 (i.e., a back side of the actuator 104). The first faceplate 204 and the second faceplate are substantially similar or identical, which enables a field configurable fail-safe operation of the actuator 104 as described below.

The lever 106 is mechanically coupled to or otherwise engages an example collet 202 that is configured to apply a clamping force to, for example, the valve shaft 114 (FIG. 1). The lever 106 and the example collet 202 may form the first coupling 120 (FIG. 1) and/or the second coupling 122 (FIG. 1) as described below in connection with FIGS. 3A and 3B. Additionally, the lever 106 is shown as extending through the first faceplate 204. In a similar manner, the lever 106 extends through the second faceplate and is hidden from view in FIGS. 2A and 2B.

The fail-safe operation of the actuator 104 is field configurable. The fail-safe operation defines whether the valve 102 (FIG. 1) is configured to open or close when power (e.g., electric power, pneumatic power, hydraulic power, etc.) is interrupted. For example, mechanically coupling the first coupling 120 to the valve shaft 114 may provide a fail-safe open configuration. On the other hand, physically turning the actuator 104 as indicated by arrow 206 and mechanically coupling the second coupling 122 to the valve shaft 114 may provide a fail-safe closed configuration.

As shown in FIGS. 2A and 2B, the first faceplate 204 includes a plurality of mounting holes 208 that may be used to mechanically couple the actuator 104 to, for example, the valve 102 (FIG. 1) via the mounting bracket 118 (FIG. 1). In FIG. 2B, the first faceplate 204 is removed from the actuator 104 to expose the lever 106 and the example collet 202. The assembly of the lever 106 and the example collet 202 is described in greater detail below. The lever 106 is mechanically coupled to an actuating element 210, which may be reciprocated or stroked by the actuator 104 and configured to turn or rotate the lever 106 to open/close the valve 102.

Figure 3A:
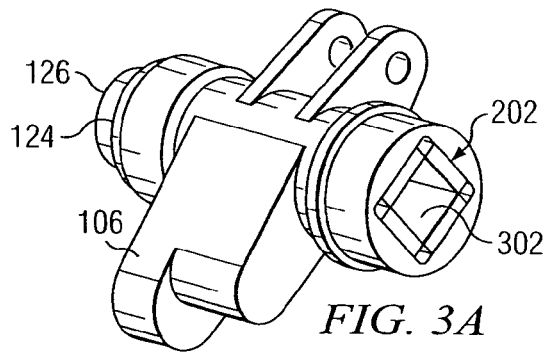
FIGS. 3A and 3B are isometric views of the lever and the example collet of FIGS. 2A and 2B.
Figure 3B:
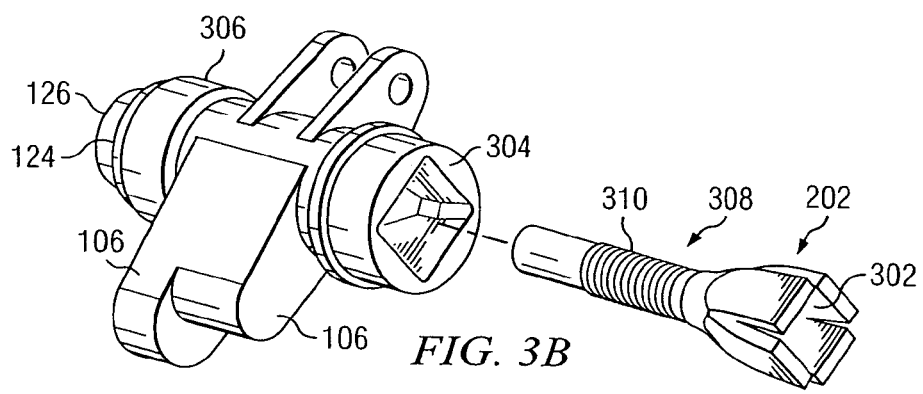

FIGS. 3A and 3B are more detailed isometric views of the lever 106 and the example collet 202 of FIGS. 2A and 2B. In particular, FIG. 3A shows the lever 106 and the example collet 202 in an assembled configuration and FIG. 3B is an exploded isometric view of the lever 106 and the collet 202. In an assembled configuration, the lever 106 and the example collet 202 form a coupling such as, for example, the couplings 120 and/or 122 of FIG. 1. The example collet 202 is shown as having a square bore 302, which is depicted in an engaged or clamped configuration in FIG. 3A and an open configuration in FIG. 3B. The lever 106 and the example collet 202 may be manufactured using any material suitable for engaging and rotating (i.e., actuating) a valve shaft such as, for example, the valve shaft 114 of FIG. 1. Additionally, the lever 106 and the example collet 202 may be manufactured using any suitable manufacturing technique such as, for example, die casting, forging, etc.

The square bore 302 may be configured to receive and engage or clamp rectangular or square shafts such as, for example, the valve shaft 114 of FIG. 1. Additionally, the square bore 302 may be configured to engage square shafts that comply with an ISO standard for square shafts. However, the square bore 302 may be implemented using any desired shape and size and may be configured to engage any shaft having a substantially similar shape and size. In general, the shape and size of the bore 302 may be configured to be substantially complementary to the shape and size of a corresponding shaft. For example, if the lever 106 and the example collet 202 are used to implement the couplings 120 and 122 of FIG. 1, the dimensions of the bore 302 may be substantially similar or identical to the dimensions of the valve shaft 114.

As shown in FIG. 3B, a first end of the lever 106 forms the first coupling 120 and provides a first sleeve 304 that is configured to receive and engage the example collet 202. In a similar manner, a second end of the lever 106 forms the second coupling 122 and provides a second sleeve 306 through which the example collet 202 may be inserted. The example collet 202 may be drawn into the lever 106 so that the first sleeve or the second sleeve engages the example collet 202. As described in greater detail below, as the example collet 202 is engaged by one of the sleeves 304 and 306, the dimensions of the bore 302 are reduced, which causes the example collet 202 to engage and apply a clamping force to, for example, the valve shaft 114.

The example collet 202 may be drawn within the lever 106 using a drawing or pulling technique. For example, the lever 106 may include a passage (not shown) extending therethrough and the example collet 202 may include an elongated member 308 that may be placed within the passage. The elongated member 308 may have a threaded portion 310 that may extend through the lever 106 and the washer 124 to threadingly engage the draw nut 126. Tightening the draw nut 126 pulls the example collet 202 into the coupling 120, which causes the dimensions of the square bore 302 to decrease. In this manner, the example collet 202 may directly engage, for example, the valve shaft 114, thus reducing and/or eliminating the gap between the surfaces of the square bore 302 and the surfaces of the valve shaft 114. In an alternative configuration, such as the examples discussed below, the elongated member 308 may include inner threads and a draw bolt (instead of the draw nut 126) that may engage the inner threads to draw the example collet 202 into the lever 106. As discussed below, a draw bolt may be combined in a single structure with a collet tool, and the term "collet tool" may refer to both a draw bolt or collet installer (which couples a collet to a lever) and a collet remover (which decouples a collet from a lever).

Lost rotational motion (i.e., lost motion) between the lever 106 and the valve shaft 114 are substantially reduced or eliminated by eliminating gaps between the surfaces of the square bore 302 and the valve shaft 114 via the example collet 202. In addition, the example collets described herein (e.g., the example collet 202) may facilitate the coupling and decoupling of actuators (e.g., the actuator 104) and shafts (e.g., the valve shaft 114) for purposes of, for example, installation processes, repair processes, etc.

Figure 4:
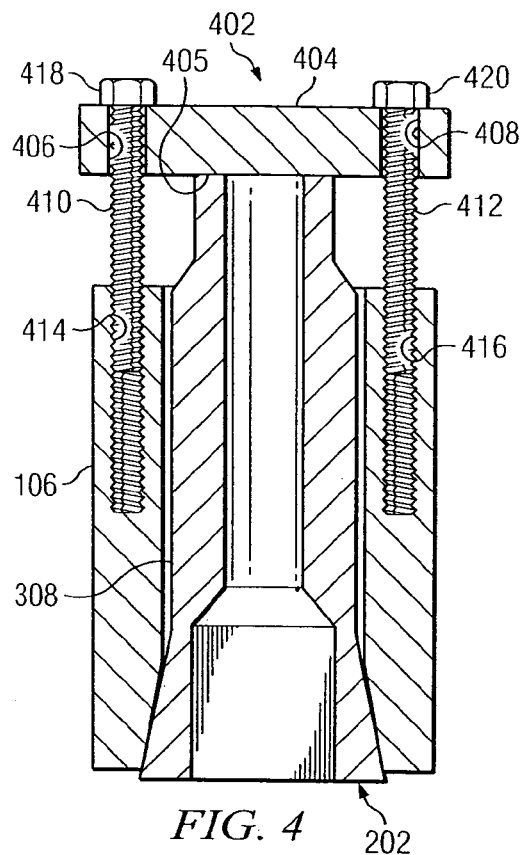
FIG. 4 is a cross sectional view of an example actuator lever with an example collet and an example collet tool.

FIG. 4 shows a cross-sectional view of the collet 202 inserted into the lever 106 with a collet tool 402 attached thereto. As shown in FIG. 4, the collet tool 402 may be used to remove the collet 202 from the lever 106 without damaging the collet 202, the lever 106 or any other component of the valve assembly 100. The collet tool 402 includes a plate 404 that is placed against the back portion or end 405 of the collet 202. The plate 404 has a first borehole 406 and a second borehole 408 through which a first stud 410 and a second stud 412 pass, respectively. The first stud 410 is inserted into a third bore hole 414 located in the lever 106, and the second stud 412 is inserted into a fourth bore hole 416 also located in the lever 106. The opposite ends of the first and second studs 410 and 412 are coupled to a first draw nut 418 and a second draw nut 420, respectively. The draw nuts 418 and 420 are rotated to drive the collet tool 402 against the end 405 of the collet 202. That is, as the draw nuts 418 and 420 are rotated into contact with the drawing plate 404, the drawing the plate 404 moves closer to the lever 106. As the plate 404 approaches the lever 106, the plate 404 pushes on the end 405 of the collet 202, overcomes the friction between the collet 202 and the lever 106, decouples the collet 202 from the lever 106, and forces the collet 202 out of the other end of the lever 106 without damaging any of the components of the valve assembly 100. This example collet tool 402 is mounted during disassembly (i.e., removal of the collet 202) and, thus, functions as a collet remover.

Figure 5:
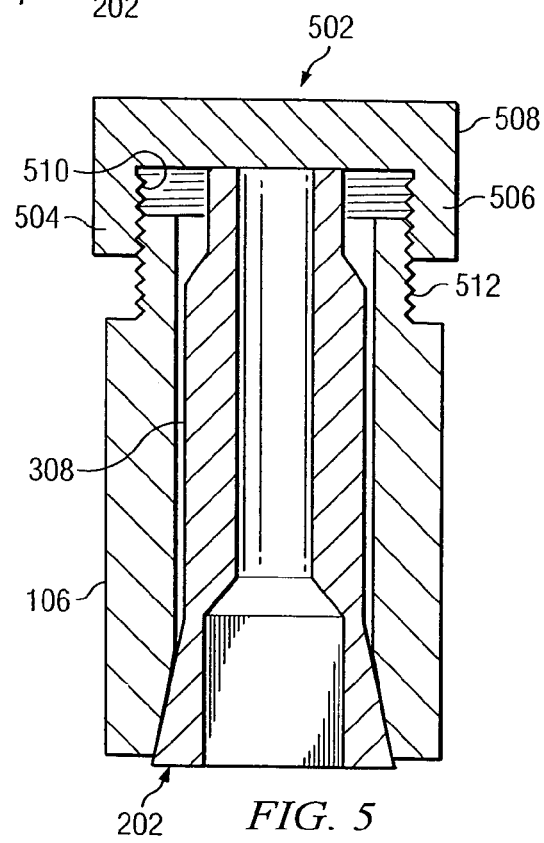
FIG. 5 is a cross-sectional view of an alternative example actuator lever, collet and collet tool.

An alternative example collet tool 502 is shown in FIG. 5. The collet tool 502 may be a substantially u-shaped component that includes a first leg 504, a second leg 506 and a back piece 508. Alternatively, the first leg 504 and the second leg 506 may be integral such that the collet tool 502 is a hollowed cylindrical structure opened at one end. At least a portion of the collet tool 502 has inner-diameter threads 510. In the illustrated example, the inner-diameter threads 510 are located at the ends of the first and second legs 504 and 506. The lever 106 further includes outer-diameter threads 512 on at least a portion of the lever 106. The outer-diameter threads 512 complement or are configured to threadably couple to the inner-diameter threads 510 of the collet tool 502. To remove the collet 202 from the lever 106, the collet tool 502 is mounted to the back of the lever 106 so that the inner-diameter threads 510 of the collet tool 502 engage the outer-diameter threads 512 of the lever 106. The collet tool 502 is then rotated causing the threads 510 and 512 to engage further and draw the collet tool 502 toward the back of the lever 106. As the collet tool 502 is rotated, the back piece 508 of the collet tool 502 contacts the collet 202, overcomes the friction between the collet 202 and the lever 106, decouples the collet 202 from the lever 106, and forces the collet 202 out of the other end of the lever 106 without damaging any of the components of the valve assembly 100. The example collet tool 502 may be mounted or used during disassembly (i.e., removal of the collet 202).

Figure 6:
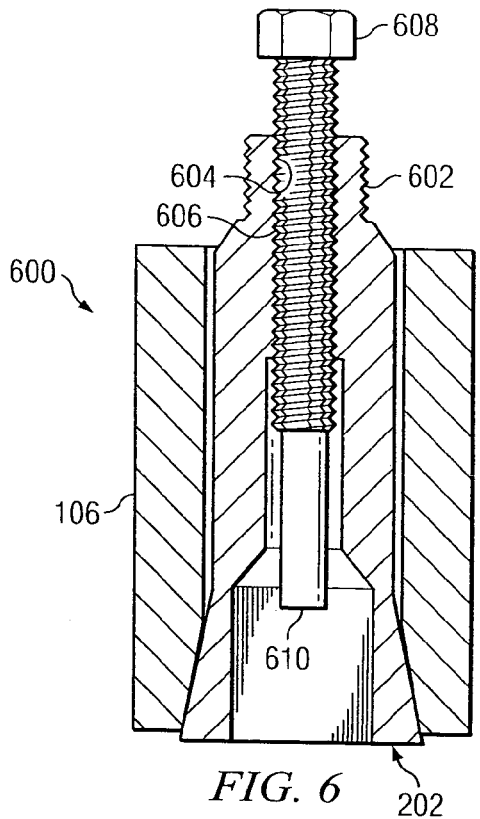
FIG. 6 is a cross-sectional view of another alternative example actuator lever, collet valve shaft remover.

FIG. 6 illustrates another alternative example collet tool 600. In this example, the collet 202 includes outer-diameter threads 602 and inner-diameter threads 604. The inner-diameter threads 604 of the collet 202 complement outer-diameter threads 606 of a valve shaft remover 608. To remove a valve shaft (not shown), the valve shaft remover 608 is inserted (e.g., threaded) into the collet 202 so the outer-diameter threads 606 of the valve shaft remover 608 engage the inner-diameter threads 604 of the collet 202. The valve shaft remover 608 is then rotated so that the valve shaft remover 608 is driven further into the collet 202. After sufficient rotation of the valve shaft remover 608, an end 610 of the valve shaft remover 608 contacts the valve shaft. As the valve shaft remover 608 is further rotated and driven further into the collet 202, the valve shaft is forced out of the collet 202.

Removing the valve shaft from the collet 202 eliminates or relieves wedging forces the valve shaft exerts via the collet 202 against the lever 106. In the absence of wedging forces, the collet 202 may be removed from the lever 106 via manual manipulation of the collet 202, interaction of a tool (e.g., a wrench or pliers) with the outer-diameter threads 602 of the collet 202, via the force of gravity, etc. In this manner, the valve shaft remover 608 also functions as a collet tool or remover. However, whereas the other collet tools 402 and 502 described above impart a force on the lever to decouple the collet 202, the valve shaft remover 608 imparts a force on the valve shaft to enable removal of the collet 202.

The illustrated example shows the valve shaft remover 608 as a bolt. However, any type of fastening device such as, for example, a screw, may be used instead. In addition, in the illustrated example, the valve shaft remover 608 is fully removable and may be mounted or used as needed (e.g., during disassembly).

Figure 7:
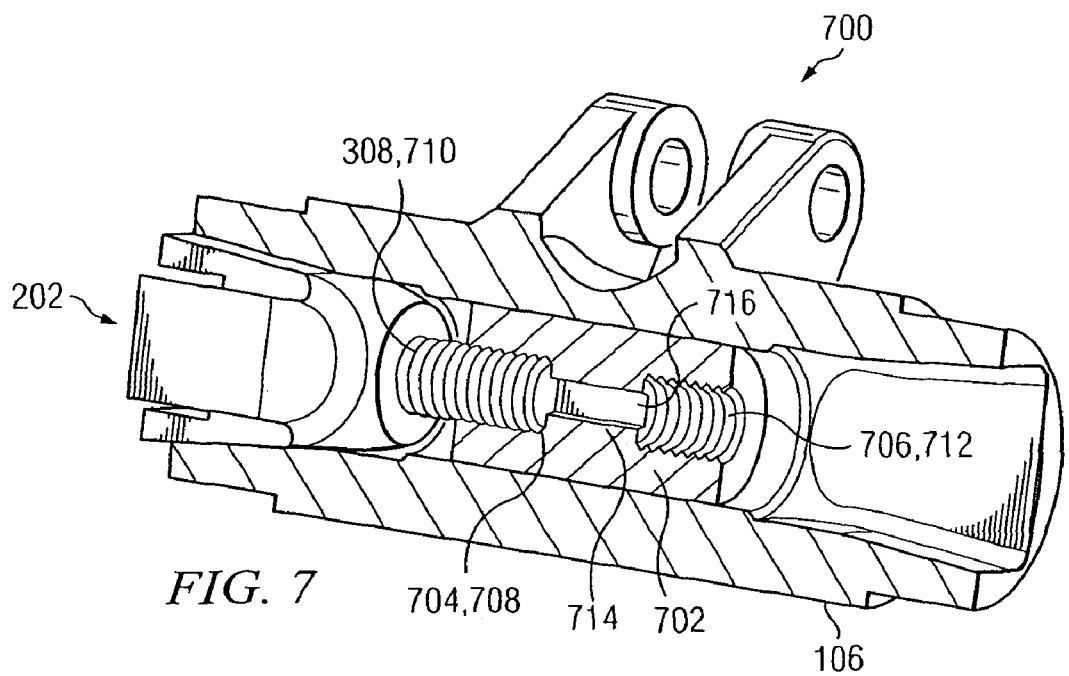
FIG. 7 is a partial cross-sectional view of yet another alternative example actuator lever and collet with an example adjustable coupling.

FIG. 7 illustrates yet another alternative collet tool 700. The apparatus shown in FIG. 7 includes an intervening structure or adjustable coupler such as, for example, an adjustable threaded coupling or coupler 702 that may be permanently located in the interior of the lever 106 and which is freely rotatable relative to the lever 106. The adjustable coupling 702 is retained in the lever 106 and is kept from translating along the center axis, or a longitudinal axis of the lever 106 by fasteners such as, for example, snap rings (not shown) or similar devices. The adjustable coupling 702 has two chambers, or a first bore hole 704 and a second bore hole 706. The first bore hole 704 has inner-diameter threads 708 that complement outer-diameter threads 710 on the elongated portion 308 of the collet 202. The second bore hole 706 also has inner-diameter threads 712. The adjustable coupling 702 further includes a center portion 714 having a cross-bore 716. In the illustrated example, the cross-bore 716 has a square cross section. However, any other polygonal shape could be used instead.

To draw the collet 202 inward and couple the collet 202 to the lever 106, a rod or shaft or other form of a collet tool (not shown) may be inserted into the end of the lever 106 opposite the collet 202. The collet tool may have a square end that is inserted into and which engages the cross-bore 716. The collet tool may then be rotated clockwise which, in turn, rotates the adjustable coupling 702 clockwise. Clockwise rotation of the adjustable coupling 702 causes the outer-diameter threads 710 of the collet 202 to engage the inner-diameter threads 708 of the first bore 704 of the adjustable coupling 702, which draws the collet 202 further into the lever 106 and couples the collet 202 and the lever 106. Alternatively, a portion of the collet tool may have outer-diameter threads that engage the inner-diameter threads 712 of the second bore hole 706. In this case, when the outer-diameter threads of the collet tool and the inner-diameter threads 712 of the adjustable coupling 702 are engaged, continual clockwise rotation of the collet tool rotates the adjustable coupling 702 clockwise and couples the collet 202 and lever 106 as described above.

Figure 8:
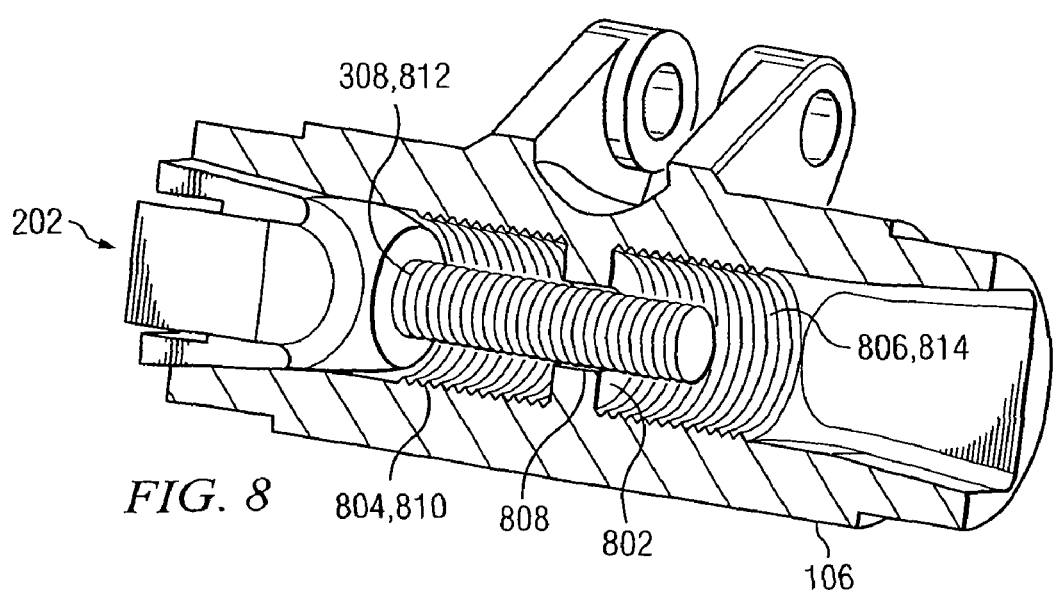
FIG. 8 is a partial cross-sectional view of still another alternative example actuator lever and collet with an alternative example adjustable coupling.
Figure 9:
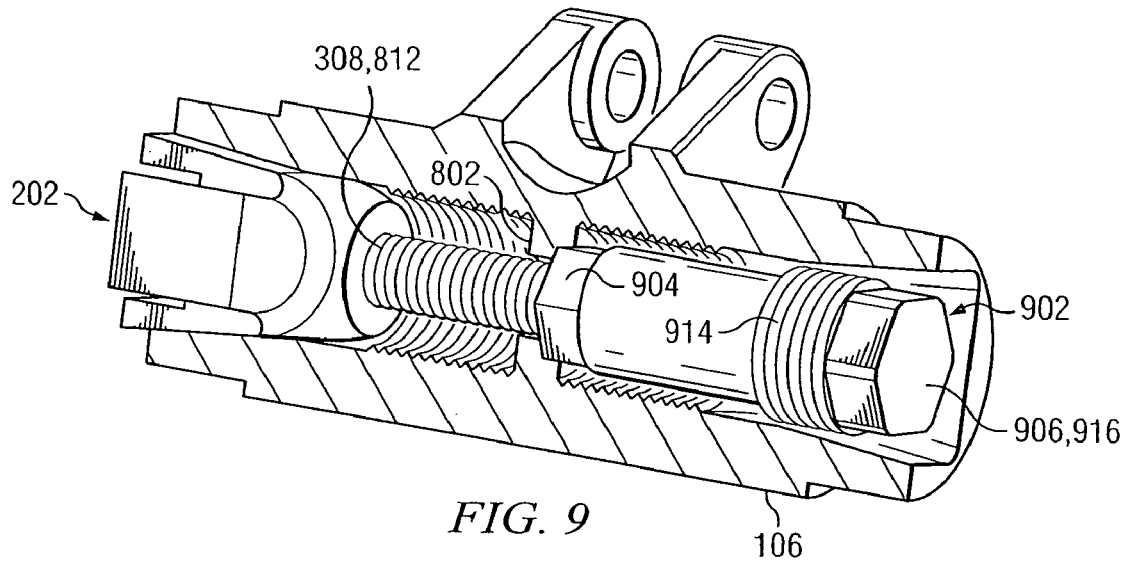
FIG. 9 shows the actuator lever and collet of FIG. 8 with an example collet tool positioned for assembly.
Figure 10:
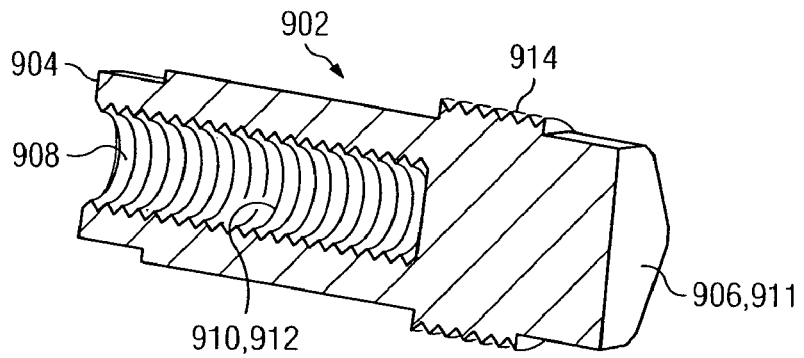
FIG. 10 is a cross-sectional view of the example collet tool of FIG. 9.

To remove the collet 202, a collet tool having a square-shaped end may be inserted into the cross-bore 716 and rotated in a counterclockwise direction. The counterclockwise rotation of the collet tool rotates the adjustable coupling 702 in a counterclockwise direction, which causes the inner-diameter threads 708 of the adjustable coupling 702 and the outer-diameter threads 710 of the shaft 308 of the collet 202 to disengage and decouple the collet 202 and the lever 106. In an alternative example combination of a lever, collet and collet tool is shown in FIGS. 8-11. The example lever 106 has an intervening structure 802. In this example, the intervening structure 802 is a web or plate 802 that divides an internal chamber of the lever 106 into a first bore hole 804 and second bore hole 806. In this example, the intervening structure, plate or web 802 may be integral with the lever 106. The web 802 has another bore hole or a center bore hole 808 through which the shank or shaft 308 of the collet 202 may pass (FIG. 8).

The collet tool 902 has a first end 904 and a second end 906. The first end 904 has an opening 908 to a bore hole 910, at least a portion of which includes inner-diameter threads 912. To couple the collet 202 and the lever 106, the collet 202 is inserted into the first bore hole 804. The first bore hole 804 includes inner-diameter threads 810 that may engages outer-diameter threads 914 on a portion of the collet tool 902. The shaft 308 of the collet 202 also has outer-diameter threads 812. When the shaft 308 is inserted through the first bore hole 804 and the center bore 808, a portion of the shaft 308 enters the second bore hole 806. The collet tool 902 is inserted into the second bore hole 806 from the opposite end. The collet tool 902 engages the shaft 308 of the collet 202. The shaft 308 enters the opening 908 and the outer-diameter threads 812 of the shaft 308 engage the inner-diameter threads 912 of the collet tool 902. As the collet tool 902 is rotated, the collet tool 902 imparts a force on the center web 802, which is transferred to the collet 202 and causes the threads 812 and 912 to engage further. In turn, the collet 202 is pulled further into a tight coupling with the lever 106. The collet tool 902 may be left in the second bore hole 806 of the lever 106 during operation of the valve assembly 100.

Figure 11:
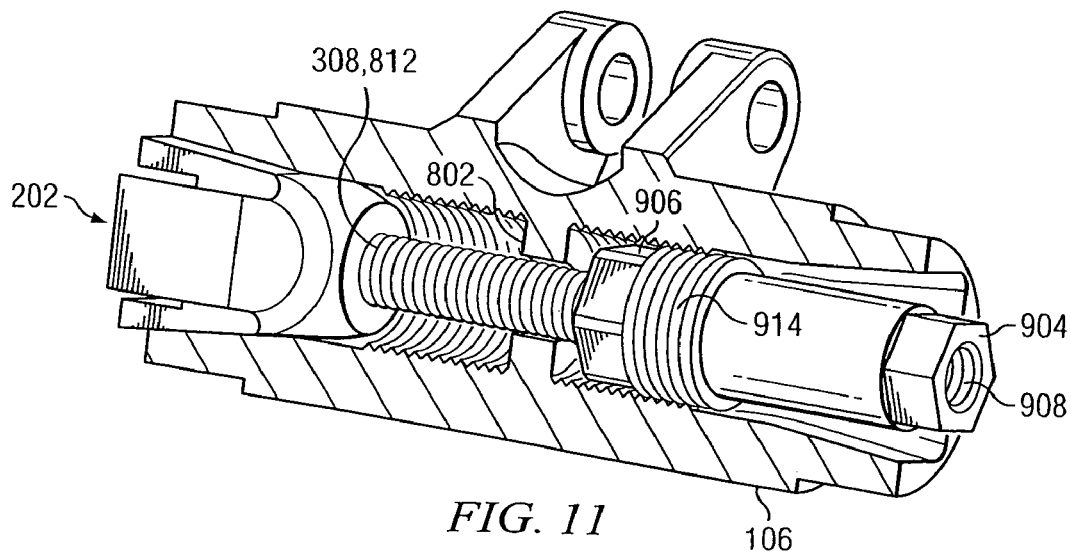
FIG. 11 shows the actuator lever, collet and collet tool of FIG. 9, with the collet tool rotated 180° and positioned for disassembly.

To remove the collet 202, the collet tool 902 is removed from the second bore hole 806 of the lever and rotated approximately 180°. The collet tool 902 is then re-inserted into the second bore hole 806 second end 906 first, as shown in FIG. 11. At least a portion of the external surface of the collet tool 902 includes outer-diameter threads 914. The outer-diameter threads 914 engage inner-diameter threads 814 that are located on at least a portion of the surface of the second bore hole 806 of the lever 106. As the collet tool 902 is rotated, the threads 914 and 814 engage further, and the collet tool 902 moves toward the interior of the lever 106. The second end 906 of the collet tool 902 includes a substantially flat and solid surface 916. As the collet tool 902 moves further into the lever 106, the collet tool 902 approaches the end of the shaft 308 of the collet 202. Further rotational force that is exerted on the collet tool 902 is transferred into linear force that acts on the collet 202 and forces the collet 202 out of the second bore hole 806. By time the collet remover 902 has been inserted far enough into the second bore 806 to reach the web or plate 808, the collet 202 has been decoupled or unseated from the lever 106. At this point, enough of the collet 202 is exposed exterior to the lever 106 to enable manual manipulation and removal of the valve shaft (not shown) from the collet 202 without causing any damage to any components in the valve assembly 100. The collet tool 902 may be stored in the second bore 806 until further future use. Storing the collet tool 902 in the lever decreases the likelihood that the collet remover 902 will be misplaced or lost and facilitates rapid conversion from assembly of the combination to disassembly.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. Apparatus for use with a process control device, the apparatus including:
   an actuator lever;
   a collet coupled to the actuator lever; and
   a collet tool removably coupled to at least one of the actuator lever or the collet, wherein the collet tool is configured to apply a force to at least one of the actuator lever, the collet, a valve shaft, or an intervening structure to decouple the collet from the actuator lever, and
   wherein at least a portion of the actuator lever includes outer-diameter threads, the collet tool has a u-shaped cross section, and a portion of the collet tool includes inner-diameter threads.

2. Apparatus as defined in claim 1, wherein the inner-diameter threads of the collet tool are to engage the outer-diameter threads of the actuator lever to cause the collet tool to contact the collet to decouple the collet and the actuator lever.

3. Apparatus as defined in claim 1, wherein the force applied by the collet tool is a rotational force.

4. Apparatus as defined in claim 1, wherein the force applied by the collet tool is a linear force.

5. Apparatus for use with a process control device, the apparatus including:
   an actuator lever;
   a collet coupled to the actuator lever; and
   a collet tool removably coupled to at least one of the actuator lever or the collet, wherein the collet tool is configured to apply a force to at least one of the actuator lever, the collet, a valve shaft, or an intervening structure to decouple the collet from the actuator lever, and
   wherein at least a portion of the collet includes outer-diameter threads and a portion of the collet tool includes inner-diameter threads.

6. Apparatus as defined in claim 5, wherein the inner-diameter threads of the collet tool are to engage the outer-diameter threads of the collet to enable the collet and the actuator lever to decouple.

7. Apparatus as defined in claim 5, wherein the collet tool comprises a plate.

8. Apparatus as defined in claim 7, wherein the plate causes the collet and the actuator lever to decouple when the plate is moved relative to the lever.

9. Apparatus as defined in claim 5, wherein the collet tool has at least one substantially flat surface.

10. Apparatus as defined in claim 5, wherein the force applied by the collet tool is a rotational force.

11. Apparatus as defined in claim 5, wherein the force applied by the collet tool is a linear force.

12. Apparatus for use with a process control device, the apparatus including:
    an actuator lever;
    a collet coupled to the actuator lever; and
    a collet tool removably coupled to at least one of the actuator lever or the collet, wherein the collet tool is configured to apply a force to at least one of the actuator lever, the collet, a valve shaft, or an intervening structure to decouple the collet from the actuator lever, and
    wherein the collet tool comprises a valve shaft remover, and wherein at least a portion of the collet has inner-diameter threads and at least a portion of the valve shaft remover has outer-diameter threads.

13. Apparatus as defined in claim 12, wherein the outer-diameter threads of the valve shaft remover are to engage the inner-diameter threads of the collet to cause the valve shaft remover to engage the collet, contact a valve shaft, and drive the valve shaft away from the collet.

14. Apparatus as defined in claim 12, wherein the force applied by the collet tool is a rotational force.

15. Apparatus as defined in claim 12, wherein the force applied by the collet tool is a linear force.

16. Apparatus for use with a process control device, the apparatus including:
    an actuator lever;
    a collet coupled to the actuator lever; and
    a collet tool removably coupled to at least one of the actuator lever or the collet, wherein the collet tool is configured to apply a force to at least one of the actuator lever, the collet, a valve shaft, or an intervening structure to decouple the collet from the actuator lever, and
    wherein the intervening structure is disposed in an interior of the actuator lever and includes a first bore hole and a second bore hole, and wherein the first and second bore holes have inner-diameter threads and the collet engages the first bore hole and the collet tool engages the second bore hole.

17. Apparatus as defined in claim 16, wherein the intervening structure is rotatable relative to the actuator lever and is to be rotated to couple or decouple the collet and the actuator lever.

18. Apparatus as defined in claim 17, wherein the intervening structure is to be rotated by the collet tool.

19. Apparatus as defined in claim 18, wherein the intervening structure is kept from translating along a longitudinal axis of the actuator lever by spacers.

20. Apparatus as defined in claim 16, wherein the force applied by the collet tool is a rotational force.

21. Apparatus as defined in claim 16, wherein the force applied by the collet tool is a linear force.

22. Apparatus for use with a process control device, the apparatus including:
    an actuator lever;
    a collet coupled to the actuator lever; and
    a collet tool removably coupled to at least one of the actuator lever or the collet, wherein the collet tool is configured to apply a force to at least one of the actuator lever, the collet, a valve shaft, or an intervening structure to decouple the collet from the actuator lever, and
    wherein at least a portion of the actuator lever includes inner-diameter threads, the intervening structure includes a plate with a bore hole there through, at least a portion of the collet includes outer-diameter threads, a least a portion of the collet tool includes inner-diameter threads, at least a portion of the collet tool includes outer-diameter threads, and a portion of the collet is to traverse the bore hole of the intervening structure when the collet is coupled to the actuator lever.

23. Apparatus as defined in claim 22, wherein the collet tool is to be oriented in a first position so that the outer-diameter threads of the collet tool engage the inner-diameter threads of the actuator lever and, when the collet tool is rotated, to draw the collet tool into the lever so that the collet tool engages the collet and decouples the collet and the actuator lever.

24. Apparatus as defined in claim 23, wherein the collet tool is oriented in a second position so that the inner-diameter threads of the collet tool engage the outer-diameter threads of the collet and, when the collet tool is rotated, draw the collet into the lever to couple the collet and the actuator lever.

25. Apparatus as defined in claim 24, wherein the first position and the second position are about 180° apart.

26. Apparatus as defined in claim 22, wherein the intervening structure is integral with the actuator lever.

27. Apparatus as defined in claim 22, wherein the collet tool may be stored in the actuator lever during operation of the process control device.

28. Apparatus as defined in claim 22, wherein the force applied by the collet tool is a rotational force.

29. Apparatus as defined in claim 22, wherein the force applied by the collet tool is a linear force.

* * * * *